(12) United States Patent
Egan

(10) Patent No.: US 6,223,364 B1
(45) Date of Patent: May 1, 2001

(54) MULTI-MOTION LIFTING AND TRANSFERRING APPARATUS AND METHOD

(76) Inventor: Thomas F. Egan, 570 Hance Rd., Binghamton, NY (US) 13903

( * ) Notice: Subject to any disclaimer, the term of this patent is extended or adjusted under 35 U.S.C. 154(b) by 0 days.

(21) Appl. No.: 09/350,378

(22) Filed: Jul. 9, 1999

Related U.S. Application Data

(60) Provisional application No. 60/092,223, filed on Jul. 9, 1998.

(51) Int. Cl.$^7$ .................................................. A61G 7/08
(52) U.S. Cl. ........................... 5/81.1 R; 5/83.1; 5/87.1
(58) Field of Search ......................... 5/81.1 R, 83.1, 5/87.1; 414/542, 462, 921; 4/461.1, 462.1, 560.1

(56) References Cited

U.S. PATENT DOCUMENTS

| | | |
|---|---|---|
| 360,578 | 4/1887 | Francis . |
| 2,792,951 * | 5/1957 | White ............................ 5/83.1 |
| 3,896,946 | 7/1975 | Forsyth et al. .................. 214/75 |
| 4,075,719 * | 2/1978 | Sullivan ........................... 5/87.1 |
| 4,226,567 | 10/1980 | Van Orsdale, Jr. ............ 414/555 |
| 4,270,630 | 6/1981 | Karkau ............................. 187/9 |
| 4,306,634 | 12/1981 | Sangster ........................... 187/9 |
| 4,365,924 | 12/1982 | Brigman et al. ............... 414/549 |
| 4,398,858 | 8/1983 | Paffrath ......................... 414/462 |
| 4,420,286 | 12/1983 | Hanson et al. ................ 414/539 |
| 4,438,640 | 3/1984 | Willis ............................... 70/94 |
| 4,475,861 | 10/1984 | Medansky ..................... 414/462 |
| 4,569,094 | 2/1986 | Hart et al. ........................ 5/81 |
| 4,573,854 | 3/1986 | McFarland ..................... 414/462 |
| 4,616,972 | 10/1986 | McFarland ..................... 414/749 |
| 4,644,595 | 2/1987 | Daniel ............................. 5/81 |
| 4,661,035 | 4/1987 | Danielsson .................... 414/550 |
| 4,671,729 | 6/1987 | McFarland ..................... 414/462 |
| 4,685,860 | 8/1987 | McFarland ..................... 414/720 |
| 4,786,072 | 11/1988 | Girvin ........................... 280/289 |
| 4,797,042 | 1/1989 | McFarland ....................... 410/3 |
| 4,801,237 | 1/1989 | Yamamoto ..................... 414/428 |
| 4,809,998 | 3/1989 | Girvin ......................... 280/250.1 |
| 4,955,779 | 9/1990 | Knackstedt .................... 414/723 |
| 5,035,467 | 7/1991 | Axelson et al. ................ 297/440 |
| 5,102,195 | 4/1992 | Axelson et al. ................ 297/440 |
| 5,154,563 | 10/1992 | Phillips ......................... 414/462 |
| 5,160,236 | 11/1992 | Redding et al. ................ 414/537 |
| 5,201,377 | 4/1993 | Wilson ............................ 180/6.5 |
| 5,205,697 | 4/1993 | Getty et al. .................... 414/341 |
| 5,261,779 | 11/1993 | Goodrich ....................... 414/546 |
| 5,333,333 | 8/1994 | Mah .................................. 5/81.1 |
| 5,348,172 | 9/1994 | Wilson ............................ 212/196 |
| 5,375,913 | 12/1994 | Blanchard ..................... 297/330 |
| 5,431,526 | 7/1995 | Peterson et al. ............... 414/543 |
| 5,456,335 | 10/1995 | Kinsey ........................... 187/240 |
| 5,456,568 | 10/1995 | Kirby et al. ................... 414/722 |
| 5,459,891 | 10/1995 | Reeve et al. ..................... 5/87.1 |
| 5,467,813 | 11/1995 | Vermaat ........................ 165/11.2 |
| 5,540,539 | 7/1996 | Wolfman et al. .............. 414/541 |
| 5,617,963 | 4/1997 | Baziuk et al. ................. 212/179 |
| 5,857,832 * | 1/1999 | Al-Temen et al. ............. 419/921 |

FOREIGN PATENT DOCUMENTS 1484-678 6/1989 (SU) .

* cited by examiner

*Primary Examiner*—Terry Lee Melius
*Assistant Examiner*—Fredrick Conley
(74) *Attorney, Agent, or Firm*—Thomas E. Anderson

(57) ABSTRACT

A multi-motion lifting and transferring apparatus for assisting persons when entering and exiting a vehicle is disclosed. In a preferred embodiment, an apparatus in accordance with the present invention is realized as having an electrically actuated rotator for rotating a support member about a substantially vertical axis, an electrically actuated extension arm for moving the electrically actuated rotator and the support member along a plane having a vertical component, and an electrically actuated slide tray for moving the electrically actuated extension arm, the electrically actuated rotator, and the support member along a substantially horizontal plane.

32 Claims, 6 Drawing Sheets

MULTI-MOTION LIFTING AND TRANSFERRING APPARATUS AND METHOD

CROSS-REFERENCE TO RELATED APPLICATIONS

This patent application is a nonprovisional patent application based on U.S. Provisional Patent Application No. 60/092,223, filed Jul. 9, 1998, which is hereby incorporated by reference herein in its entirety.

FIELD OF THE INVENTION

The present invention relates generally to devices and methods for lifting and transferring persons into and out of vehicles and, more particularly, to a multi-motion lifting and transferring apparatus and method for assisting persons when entering and exiting a vehicle.

BACKGROUND OF THE INVENTION

Difficulties are often encountered when transferring disabled persons from one location to another. Particularly in the case of wheelchair-bound persons, it is often quite difficult to lift and transfer such persons to and from their wheelchair from and to, for example, a motor vehicle. One or more persons are usually required to assist the disabled person.

There have been some inventive efforts directed at alleviating the problems associated with transferring disabled persons from one location to another. For example, in U.S. Pat. No. 4,365,924, Brigman et al. disclose a disabled person transfer device for transferring a disabled person from a wheelchair to a vehicle. Also, in U.S. Pat. No. 5,459,891, Reeve et al. disclose a hydraulically powered lift and transport apparatus for lifting and transporting wheelchair bound persons.

The aforementioned patents disclose devices which allow a disabled person to be lifted from a wheelchair or a bed and transferred to another location. However, the devices disclosed in both of these patents, as well as other known devices, have drawbacks in the areas of cost and complexity which could limit the potential mobility of a disabled individual. For instance, the disabled person transfer device disclosed in U.S. Pat. No. 4,365,924 requires extensive modifications to a vehicle as well as a modified wheelchair for use with the device. Also, the lift and transport apparatus disclosed in U.S. Pat. No. 5,459,891 requires a remotely located hydraulic pump and 120 VAC current to power the various components of the apparatus. Similar drawbacks exist for other known lifting and transferring devices.

In view of the foregoing, it would be desirable to provide a lifting and transferring apparatus for assisting persons when entering and exiting a vehicle which overcomes the above-described inadequacies and shortcomings.

SUMMARY OF THE INVENTION

According to the present invention, a multi-motion lifting and transferring apparatus and method is provided for assisting persons when entering and exiting a vehicle. In a preferred embodiment, an apparatus in accordance with the present invention is realized as having an electrically actuated rotator for rotating a support member about a substantially vertical axis, an electrically actuated extension arm for moving the electrically actuated rotator and the support member along a plane having a vertical component (e.g., 45 degrees from the horizontal), and an electrically actuated slide tray for moving the electrically actuated extension arm, the electrically actuated rotator, and the support member along a substantially horizontal plane. The support member typically supports a seat for accommodating at least one person.

In accordance with other aspects of the present invention, the electrically actuated rotator can rotate the support member while the electrically actuated slide tray moves the electrically actuated extension arm, the electrically actuated rotator, and the support member. Alternatively, the electrically actuated rotator, the electrically actuated extension arm, and the electrically actuated slide tray can operate in a sequential order.

In accordance with further aspects of the present invention, the electrically actuated extension arm can move the electrically actuated rotator and the support member between a first position and a second position along the plane having the vertical component, wherein the electrically actuated rotator is prevented from operating when the electrically actuated extension arm moves the electrically actuated rotator and the support member from the first position. The first position is typically located vertically higher than the second position. Also, slide contacts can be mounted proximate the electrically actuated extension arm for disconnecting power to the electrically actuated rotator when the electrically actuated extension arm moves the electrically actuated rotator and the support member from the first position, thereby preventing the electrically actuated rotator from operating. The slide contacts preferably include mating contact plungers and contact plates.

In accordance with still further aspects of the present invention, the electrically actuated extension arm can move the electrically actuated rotator and the support member between a first position and a second position along the plane having the vertical component, wherein the electrically actuated slide tray is prevented from operating when the electrically actuated extension arm moves the electrically actuated rotator and the support member from the first position. Again, the first position is typically located vertically higher than the second position, and slide contacts can be mounted proximate the electrically actuated extension arm for disconnecting power to the electrically actuated slide tray when the electrically actuated extension arm moves the electrically actuated rotator and the support member from the first position, thereby preventing the electrically actuated slide tray from operating.

In accordance with still further aspects of the present invention, the electrically actuated rotator can rotate the support member between a first position and a second position about the substantially vertical axis, wherein the electrically actuated extension arm is prevented from operating when the electrically actuated rotator rotates the support member from the first position. In this case, the first position is typically a loading position, while the second position is typically a locking position. If such is the case, an electrically actuated latch can be provided for latching the support member into the locking position. The electrically actuated latch can include a release mechanism so as to allow manual operation. Also, the electrically actuated latch can be formed between a first mating latch component associated with the support member and a second mating latch component associated with the electrically actuated extension arm, wherein the electrically actuated extension arm is adjustable relative to the electrically actuated slide tray without affecting the mating alignment of the electrically actuated latch. The electrically actuated rotator is preferably configured to rotate the support member into the locking position with maximum thrust.

In accordance with still further aspects of the present invention, a swivel bearing is typically provided for pivotally supporting the support member, wherein the swivel bearing and the electrically actuated rotator are co-located beneath the support member.

In accordance with still further aspects of the present invention, the electrically actuated slide tray can move the electrically actuated extension arm, the electrically actuated rotator, and the support member between a first position and a second position along the substantially horizontal plane, wherein the electrically actuated extension arm is prevented from operating when the electrically actuated slide tray moves the electrically actuated extension arm, the electrically actuated rotator, and the support member from the first position. In this case, the first position is typically a loading position.

In accordance with still further aspects of the present invention, the electrically actuated rotator, the electrically actuated extension arm, and the electrically actuated slide tray are preferably electrically configured to operate from a common control unit. The common control unit can be a remote control unit, or a hard wired modular control unit.

In accordance with still further aspects of the present invention, at least one of the electrically actuated rotator and the electrically actuated slide tray beneficially includes a release mechanism so as to allow manual operation. Similarly, the electrically actuated extension arm beneficially includes a mechanical crank so as to allow manual operation.

In accordance with still further aspects of the present invention, at least one of the electrically actuated rotator, the electrically actuated extension arm, and the electrically actuated slide tray beneficially includes a limit switch for preventing excessive movement and/or rotation.

The present invention apparatus and method is typically used to transfer disabled persons in and out of vans, trucks, recreational vehicles, and other vehicles, but can also be used to transfer persons and/or things for other purposes.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
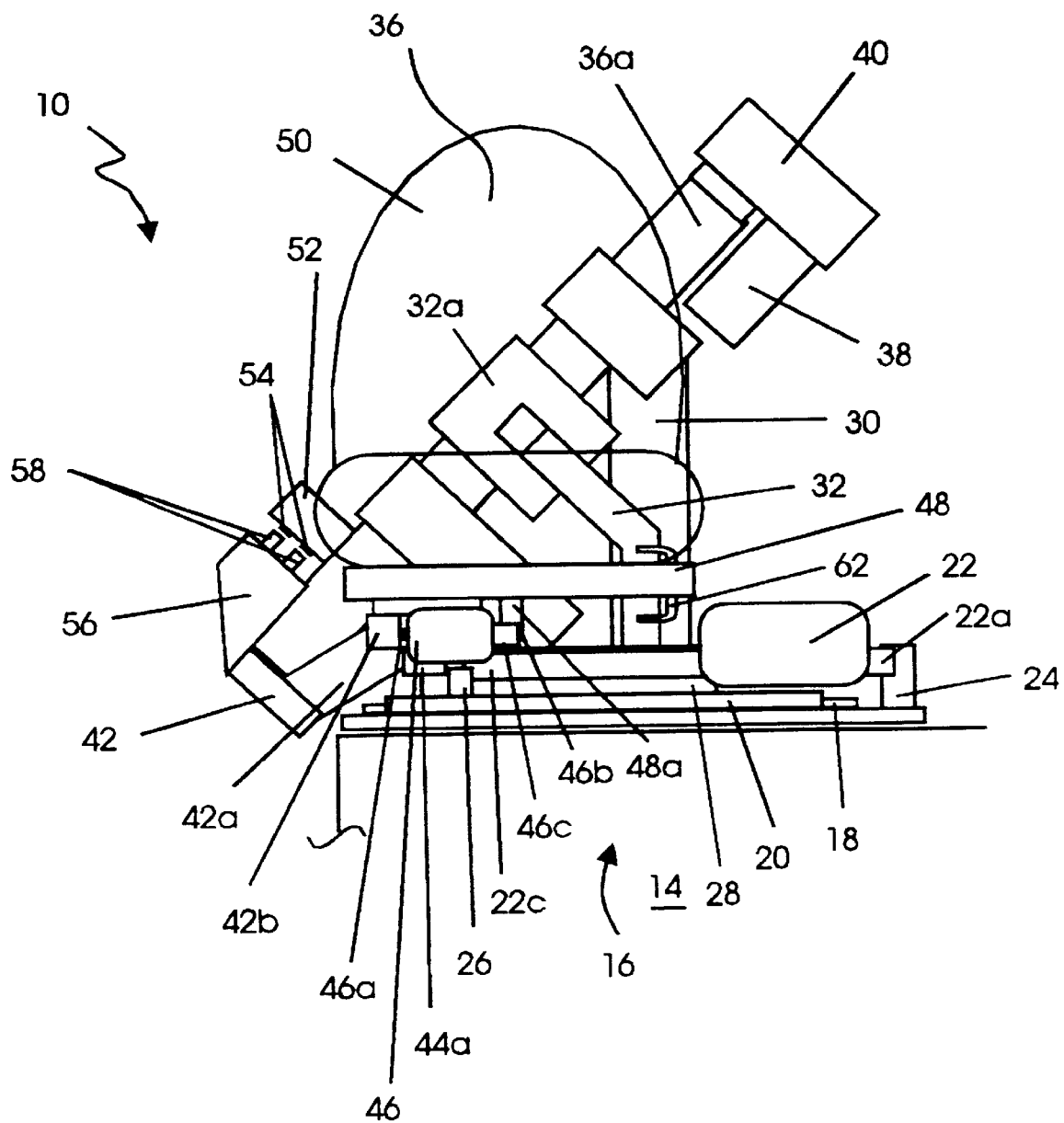
FIG. 1 is a front view of a multi-motion lifting and transferring apparatus in accordance with the present invention.
Figure 2:
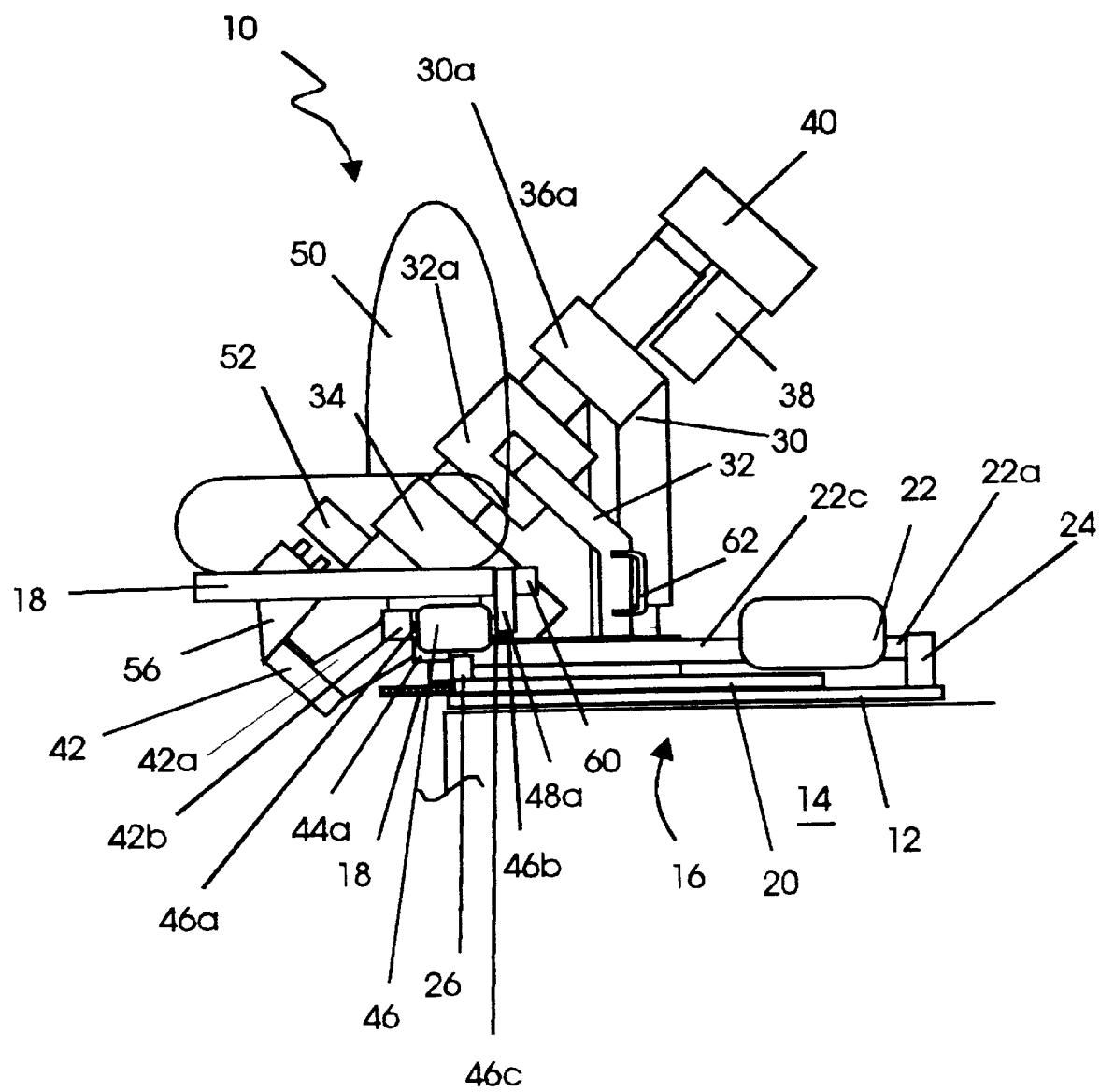
FIG. 2 is a front view of the multi-motion lifting and transferring apparatus shown in FIG. 1 with a resident seat rotated to a ninety degrees position in accordance with the present invention.
Figure 3:
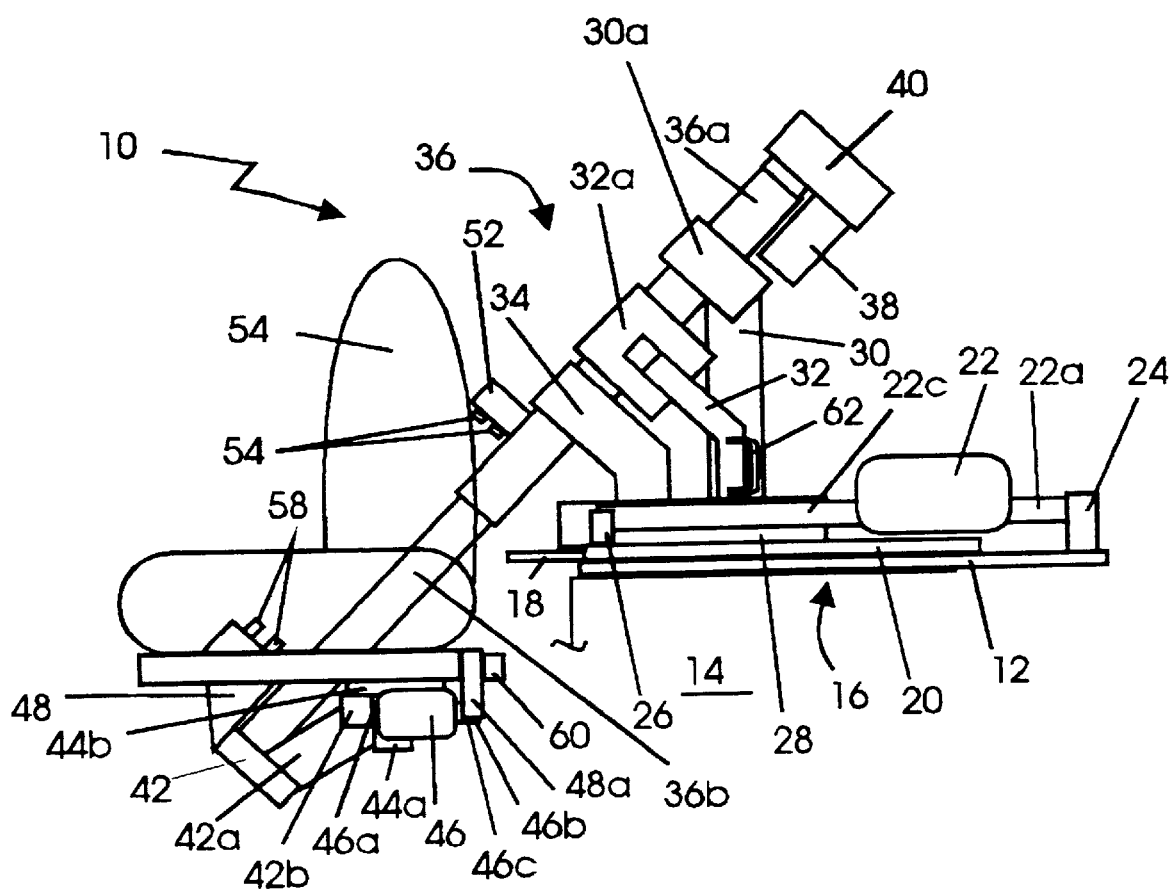
FIG. 3 is a front view of the multi-motion lifting and transferring apparatus shown in FIG. 1 with the resident seat rotated to the ninety degrees position and fully lowered in accordance with the present invention.

Referring to FIGS. 1–3, there is shown a multi-motion lifting and transferring apparatus 10 in accordance with the present invention in three respective positions. Beginning from the bottom of the apparatus 10 upward, the apparatus 10 includes a horizontal support plate 12 for securely mounting the apparatus 10 to, for example, the floor 14 of a vehicle or other structure. The apparatus 10 also includes a slide tray assembly 16 comprising a slide plate 18, a pair of slide tray tracks 20 (only one shown due to view), and an electrical slide tray actuator 22. The pair of slide tray tracks 20 allow the slide plate 18 to move bidirectionally along a horizontal plane. The movement of the slide tray 18 is controlled by the slide tray actuator 22. That is, the slide tray actuator 22 is supported at a first end 22a thereof by a first support block 24, which is securely attached to the horizontal support plate 12, while the slide tray actuator 22 is supported at a second end 22b thereof by a second support block 26, which is securely attached to the slide plate 18. The slide tray actuator 22 has an extension rod 22c which is extended and retracted during operation of the slide tray actuator 22. Thus, the slide tray 18 can be moved bidirectionally along a horizontal plane by extending and retracting the extension rod 22c during operation of the slide tray actuator 22. FIG. 1 shows the extension rod 22c in a fully retracted position, while FIGS. 2 and 3 show the extension rod 22c in a fully extended position.

Also securely attached to the slide tray 18 is a horizontal support 28, and the apparatus 10 also includes a vertical support 30, a vertical/diagonal support 32, and a diagonal support 34, all of which are attached to the horizontal support 28 on their lower ends. The upper ends of the vertical support 30, the vertical/diagonal support 32, and the diagonal support 34 are all attached to an extension arm 36 for supporting the same. The vertical support 30 and the vertical/diagonal support 32 are attached to the extension arm 36 using attachment plates 30a and 32a, respectively.

The extension arm 36 includes an outer member 36a and an inner member 36b (see FIG. 3). The upper ends of the vertical support 30, the vertical/diagonal support 32, and the diagonal support 34 are all attached to the outer member 36a of the extension arm 36. The inner member 36b is movable in a telescoping manner relative to the outer member 36a. That is, the extension arm 36 can be lengthened by removing the inner member 36b from within the outer member 36a. Conversely, the extension arm 36 can be shortened by inserting the inner member 36b to within the outer member 36a. The lengthening/shortening of the extension arm 36 is controlled by an electrical extension arm actuator 38, which is connected to the extension arm 36 through a gearbox 40. FIGS. 1 and 2 show the extension arm 36 fully shortened, while FIG. 3 shows the extension arm 36 fully lengthened.

At this point it should be noted that, although FIGS. 1–3 show the extension arm 36 positioned at a forty-five degree angle with respect to the vertical support 30, other angles are also possible.

The lower end of the inner member 36b of the extension arm 36 has a support arm 42 for securely supporting a lower pivot bearing 44a via a first support member 42a. An upper pivot bearing 44b is securely attached to a seat support 48 such that the seat support 48 may be rotated about a substantially vertical pivot axis formed between the lower pivot bearing 44a and the upper pivot bearing 44b. The support arm 42 also has a second support member 42b for pivotally supporting a first end 46a of an electrical seat rotation actuator 46. It should be noted that the second support member 42b could extend from the lower pivot bearing 44a rather than from the support arm 42.

The seat support 48 has a support post 48a extending downward therefrom for pivotally supporting a second end 46b of the seat rotation actuator 46. The seat rotation actuator 46 has an extension rod 46c which can be extended and retracted during operation of the seat rotation actuator 46. A seat 50 is typically mounted to the seat support 48 for accommodating one or more persons. Thus, during operation of the seat rotation actuator 46, the seat 50 can be rotated ninety degrees about the substantially vertical pivot axis formed between the lower pivot bearing 44a and the upper pivot bearing 44b by extending and retracting the extension rod 46c. FIG. 1 shows the seat 50 in a zero degrees position. FIGS. 2 and 3 show the seat 50 in a ninety degrees position.

At this point it should be noted that an electrically actuated latch 60 is securely mounted to the rear of the seat support 48 (see FIGS. 2 and 3) for engaging a striker bar 62 that is securely mounted to the vertical/diagonal support 32 when seat 50, and hence the seat support 48, is in the zero degrees position, thereby locking the seat 50 and the seat support 48 in the zero degrees position as will be described in more detail below.

At this point it should be noted that the position and orientation of the seat rotation actuator 46 is such that maximum thrust is provided when rotating the seat support 48 into the zero degrees position, thereby insuring a solid engagement between the electrically actuated latch 60 and the striker bar 62. It should also be noted that the seat rotation actuator 46 is conveniently co-located with the lower pivot bearing 44a and the upper pivot bearing 44b beneath the seat support 48 (i.e., out of harms way).

Figure 4:
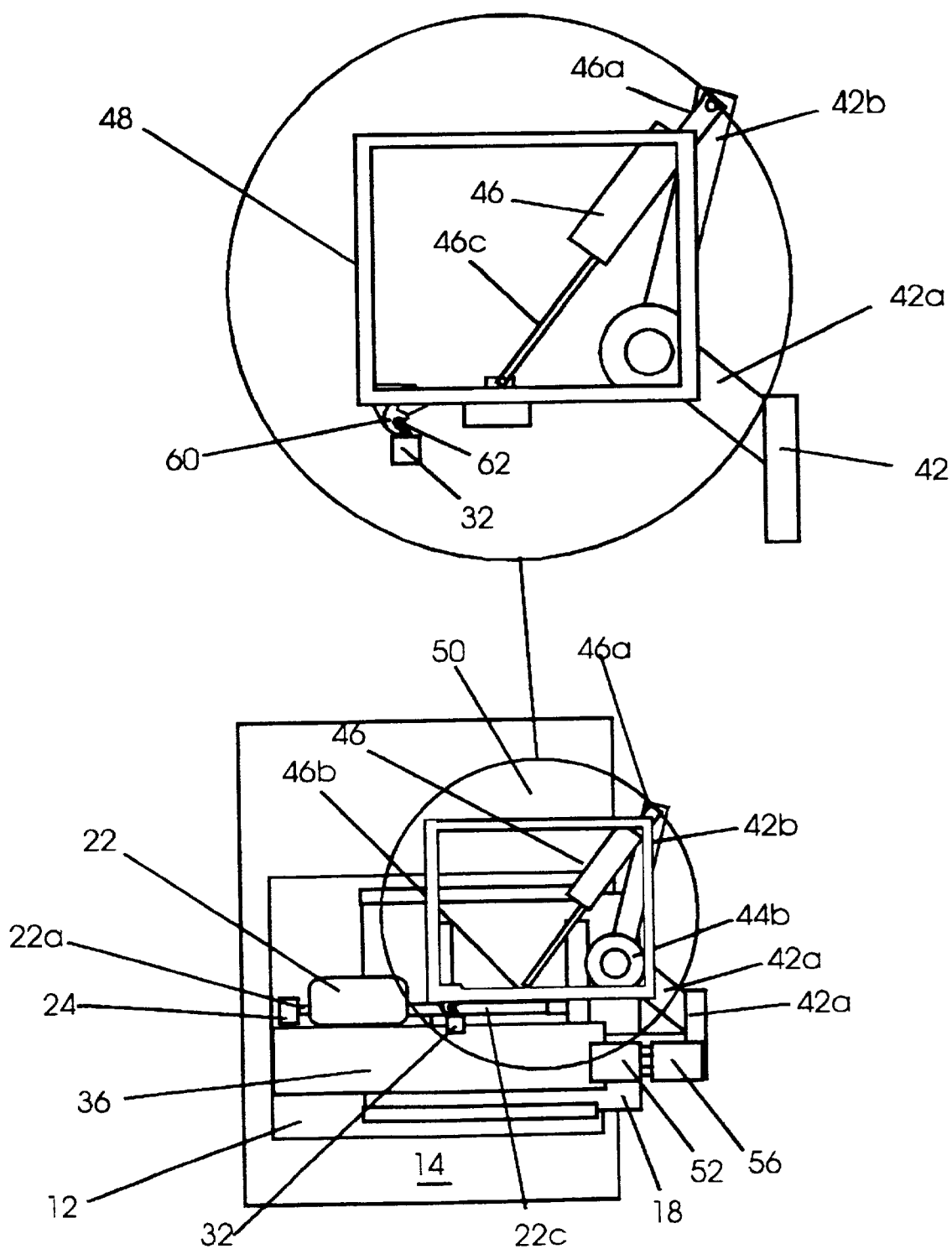
FIG. 4 is a top view and a focused top view of the multi-motion lifting and transferring apparatus shown in FIG. 1 in accordance with the present invention.

Referring to FIG. 4, there is shown a top view and a focused top view of the apparatus 10 wherein some of the components are more easily discernible than in FIGS. 1–3. FIG. 4 shows the extension arm 36 having a cover 36' for purposes of appearance and safety.

During typical operation of the apparatus 10, the seat 50 is initially in the zero degrees position with the extension rod 46c fully extended, the extension arm 36 fully shortened, and the extension rod 22c fully retracted (see FIG. 1). The seat 50 is then rotated to the ninety degrees position by fully retracting the extension rod 46c, and the slide tray 18 is then moved horizontally by extending the extension rod 22c (see FIG. 2). The seat 50 is then lowered by lengthening the extension arm 36 (see FIG. 3). It should be noted that the apparatus 10 can operate sequentially, as just described, or in a semi-sequential manner wherein the rotation of the seat 50 and the movement of the slide tray 18 are performed simultaneously. It should also be noted that the apparatus 10 can operate without the slide tray assembly 16 wherein the horizontal support 28 is mounted directly to the vehicle floor 14 or other structure.

At this point it should be noted that the apparatus 10 has a first contact block 52 having first electrical contacts 54, and a second contact block 56 having second electrical contacts 58. The purpose of these components 52–58 is to ensure that the seat 50 is only rotated by the seat rotation actuator 46 and moved horizontally by the slide tray assembly 16 when an electrical connection is made between at least two of the first electrical contacts 54 and the second electrical contacts 58. That is, these components 52–58 operate to provide power to the seat rotation actuator 46 and the slide tray assembly 16 only when an electrical connection is made between the first electrical contacts 54 and the second electrical contacts 58. Thus, the seat 50 cannot be rotated or moved horizontally unless the extension arm 36 is in the fully shortened position (see FIGS. 1 and 2). Similarly, the circuitry of the apparatus 10 prevents the electrical extension arm actuator 38 from moving the seat 50 by lengthening/shortening the extension arm 36 unless the seat 50 has been rotated to the ninety degrees position by the seat rotation actuator 46 and has been moved horizontally to the point where the extension rod 22c is fully extended. This is typically accomplished through limit switches within the slide tray actuator 22. Limit switches may also be used to limit excess movement/rotation by all of the actuators. It should be noted that the first electrical contacts 54 are preferably contact plates, while the second electrical contacts 58 are preferably mating contact plungers, or vice versa.

An important feature of the apparatus 10 is that the seat support 48 is mechanically latched when in the zero degrees position, but is electrically unlatched by the electrically actuated latch 60 when rotated from the zero degrees position to the ninety degrees position. This is important for safety purposes when the apparatus 10 is used in, for example, moving vehicles, and the seat 50 is locked in the zero degrees position (e.g., facing forward in a moving vehicle).

Another important feature of the apparatus 10 is that all of the actuators have release mechanisms so as to allow manual operation. However, the extension arm 36 includes a mechanical crank so as to allow manual operation.

At this point it should be noted that the vertical/diagonal support 32 may optionally be attached only to the extension arm 36 and not to the horizontal support 28. The purpose of this configuration allows the position of the extension arm 36 to be adjusted relative to the slide tray assembly 16 without affecting the mating alignment between the electrically actuated latch 60 and the striker bar 62. That is, the position where the extension arm 36 is attached to and supported by the upper ends of the vertical support 30 and the diagonal support 34 will not affect the mating alignment between the electrically actuated latch 60 and the striker bar 62. The extension arm 36 will support the vertical/diagonal support 32, and the vertical/diagonal support 32 will support the striker bar 62.

At this point it should be noted that the apparatus 10 is controlled by a common control unit. That is, the electrically actuated rotator, the electrically actuated extension arm, and the electrically actuated slide tray are all electrically configured to operate from a common control unit. This common control unit can be a remote control unit, or a hard wired control unit preferably having modular features such as, for example, easy disconnectability. It should also be noted that both a remote control unit and a hard wired modular control unit may be used and operated simultaneously without damage to the unit.

Figure 5:
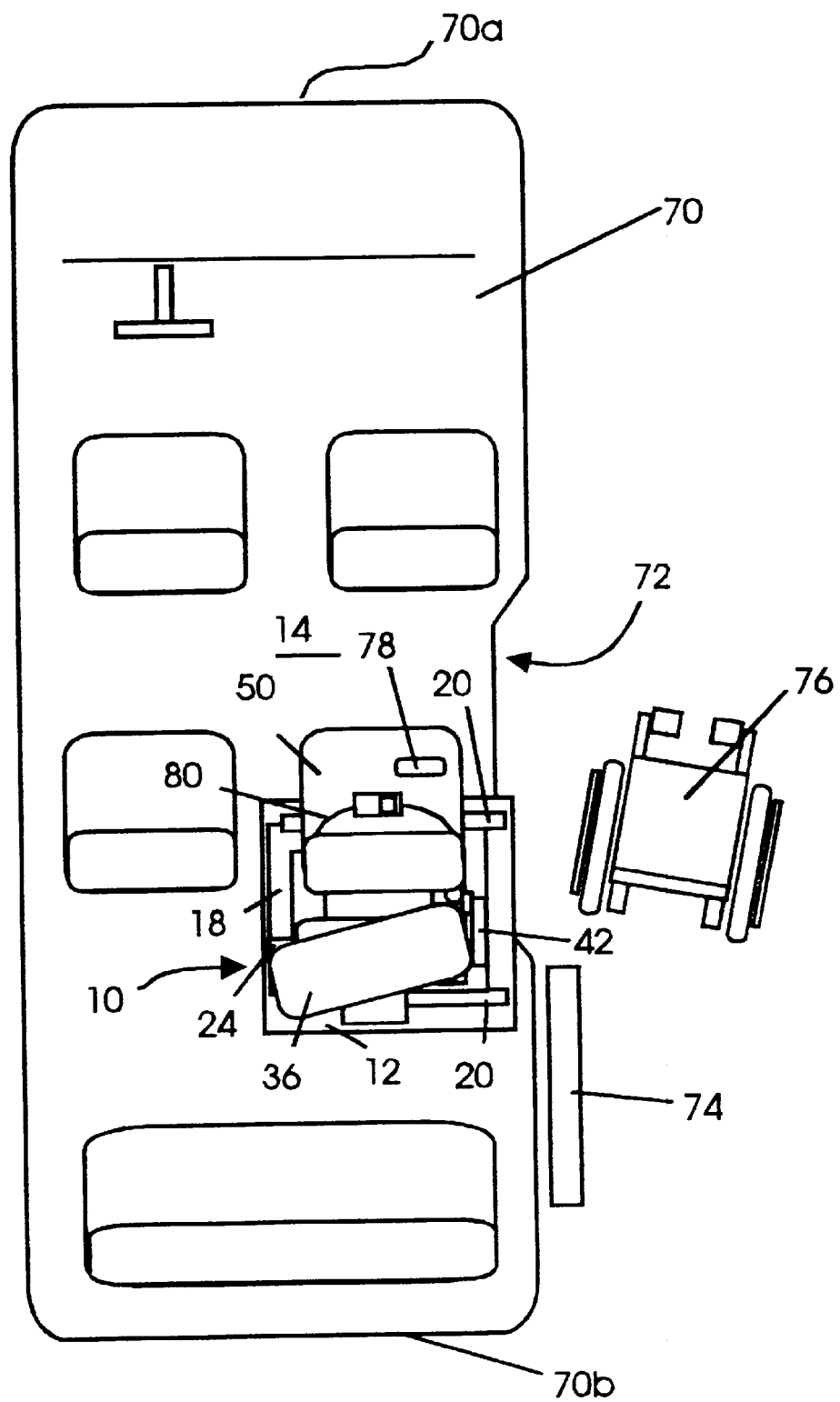
FIG. 5 is a top view of a van having the multi-motion lifting and transferring apparatus shown in FIG. 1 mounted therein in a locked position in accordance with the present invention.

Referring to FIG. 5, there is shown a top view of a van 70 having the apparatus 10 mounted therein in a locked position in accordance with the present invention. The van 70 has a front 70a and a rear 70b, and the apparatus 10 is facing toward the front 70a of the van 70. The apparatus 10 is mounted near an opening 72 in the side of the van 70 caused by an open side door 74. FIG. 5 shows a wheelchair 76 near the opening 72, and a control unit 78 on the seat 50. FIG. 5 also shows the seat 50 having a seatbelt 80.

Figure 6:
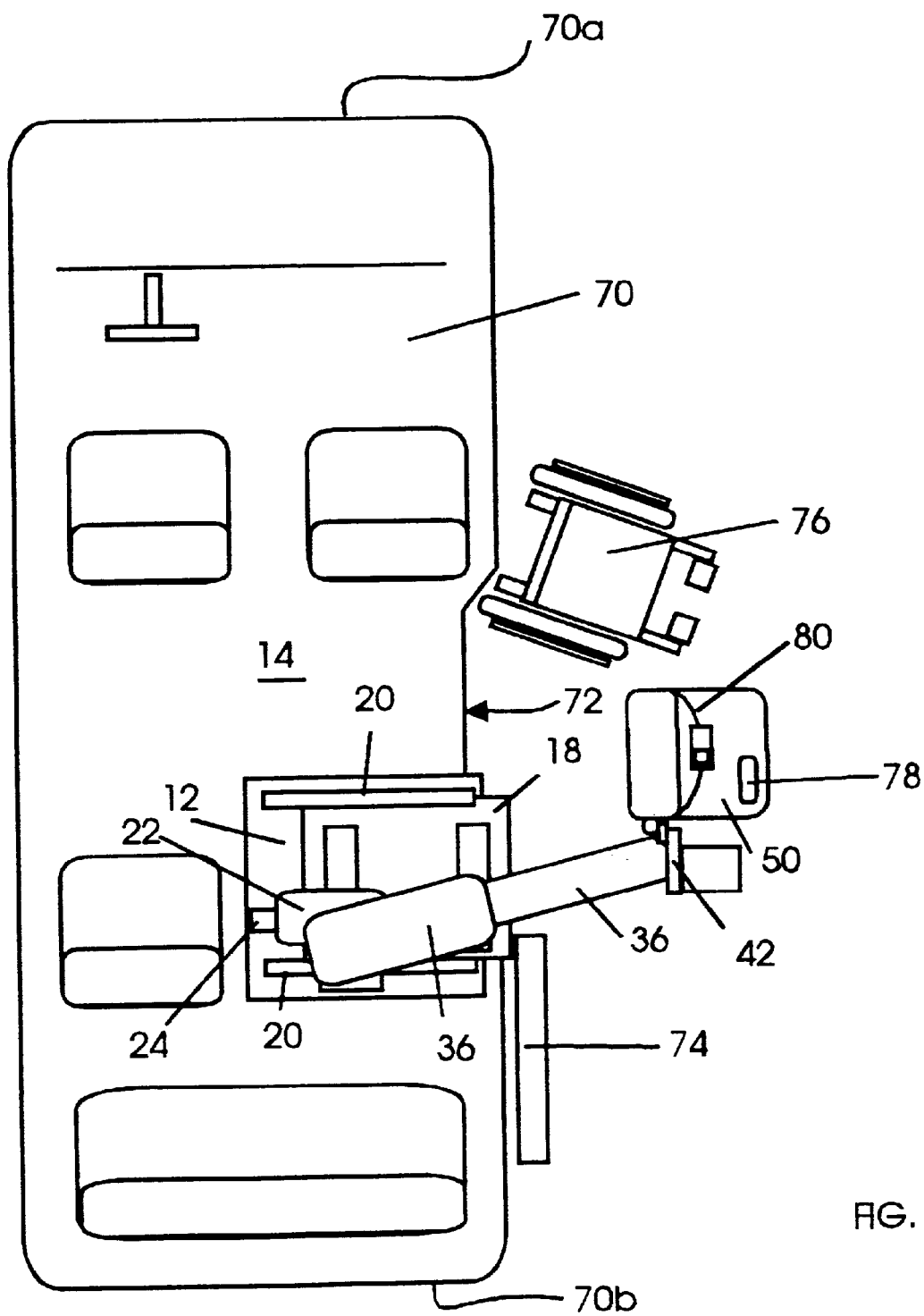
FIG. 6 is a top view of a van having the multi-motion lifting and transferring apparatus shown in FIG. 1 mounted therein in a loading position in accordance with the present invention.

Referring to FIG. 6, the apparatus 10 is shown in a loading position in accordance with the present invention. That is, the extension arm 36 is fully lengthened, the extension rod 46c is fully retracted, and the extension rod 22c is fully extended (see FIG. 3).

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A multi-motion lifting and transferring apparatus for assisting persons when entering and exiting a vehicle, the apparatus comprising:

an electrically actuated rotator for rotating a support member about a substantially vertical axis;

an electrically actuated extension arm for moving the electrically actuated rotator and the support member along a plane having a vertical component; and an electrically actuated slide tray for moving the electrically actuated extension arm, the electrically actuated rotator, and the support member along a substantially horizontal plane.

2. The apparatus as defined in claim 1, wherein the electrically actuated rotator rotates the support member while the electrically actuated slide tray moves the electrically actuated extension arm, the electrically actuated rotator, and the support member.

3. The apparatus as defined in claim 1, wherein the electrically actuated rotator, the electrically actuated extension arm, and the electrically actuated slide tray operate in a sequential order.

4. The apparatus as defined in claim 1, wherein the electrically actuated extension arm moves the electrically actuated rotator and the support member between a first position and a second position along the plane having the vertical component, and wherein the electrically actuated rotator is prevented from operating when the electrically actuated extension arm moves the electrically actuated rotator and the support member from the first position.

5. The apparatus as defined in claim 4, wherein the first position is located vertically higher than the second position.

6. The apparatus as defined in claim 4, further comprising:

slide contacts mounted proximate the electrically actuated extension arm for disconnecting power to the electrically actuated rotator when the electrically actuated extension arm moves the electrically actuated rotator and the support member from the first position, thereby preventing the electrically actuated rotator from operating.

7. The apparatus as defined in claim 6, wherein the slide contacts include mating contact plungers and contact plates.

8. The apparatus as defined in claim 1, wherein the electrically actuated extension arm moves the electrically actuated rotator and the support member between a first position and a second position along the plane having the vertical component, and wherein the electrically actuated slide tray is prevented from operating when the electrically actuated extension arm moves the electrically actuated rotator and the support member from the first position.

9. The apparatus as defined in claim 8, wherein the first position is located vertically higher than the second position.

10. The apparatus as defined in claim 8, further comprising:

slide contacts mounted proximate the electrically actuated extension arm for disconnecting power to the electrically actuated slide tray when the electrically actuated extension arm moves the electrically actuated rotator and the support member from the first position, thereby preventing the electrically actuated slide tray from operating.

11. The apparatus as defined in claim 10, wherein the slide contacts include mating contact plungers and contact plates.

12. The apparatus as defined in claim 1, wherein the electrically actuated rotator rotates the support member between a first position and a second position about the substantially vertical axis, and wherein the electrically actuated extension arm is prevented from operating when the electrically actuated rotator rotates the support member from the first position.

13. The apparatus as defined in claim 12, wherein the first position is a loading position.

14. The apparatus as defined in claim 12, wherein the second position is a locking position, further comprising:

an electrically actuated latch for latching the support member into the locking position.

15. The apparatus as defined in claim 14, wherein the electrically actuated latch includes a release mechanism so as to allow manual operation.

16. The apparatus as defined in claim 14, wherein the electrically actuated latch is formed between a first mating latch component associated with the support member and a second mating latch component associated with the electrically actuated extension arm, wherein the electrically actuated extension arm is adjustable relative to the electrically actuated slide tray without affecting the mating alignment of the electrically actuated latch.

17. The apparatus as defined in claim 14, wherein the electrically actuated rotator is configured to rotate the support member into the locking position with maximum thrust.

18. The apparatus as defined in claim 1, further comprising:

a swivel bearing for pivotally supporting the support member, wherein the swivel bearing and the electrically actuated rotator are co-located beneath the support member.

19. The apparatus as defined in claim 1, wherein the electrically actuated slide tray moves the electrically actuated extension arm, the electrically actuated rotator, and the support member between a first position and a second position along the substantially horizontal plane, and wherein the electrically actuated extension arm is prevented from operating when the electrically actuated slide tray moves the electrically actuated extension arm, the electrically actuated rotator, and the support member from the first position.

20. The apparatus as defined in claim 19, wherein the first position is a loading position.

21. The apparatus as defined in claim 1, wherein the electrically actuated rotator, the electrically actuated extension arm, and the electrically actuated slide tray are electrically configured to operate from a common control unit.

22. The apparatus as defined in claim 1, further comprising:

a common control unit for operating the electrically actuated rotator, the electrically actuated extension arm, and the electrically actuated slide tray.

23. The apparatus as defined in claim 22, wherein the common control unit is a remote control unit.

24. The apparatus as defined in claim 22, wherein the common control unit is a hard wired modular control unit.

25. The apparatus as defined in claim 1, wherein the vertical component is approximately 45 degrees from a substantially horizontal plane.

26. The apparatus as defined in claim 1, wherein at least one of the electrically actuated rotator and the electrically actuated slide tray includes a release mechanism so as to allow manual operation.

27. The apparatus as defined in claim 1, wherein at least one of the electrically actuated rotator, the electrically actuated extension arm, and the electrically actuated slide tray includes a limit switch for preventing excessive movement and/or rotation.

28. The apparatus as defined in claim 1, wherein the electrically actuated extension arm includes a mechanical crank so as to allow manual operation.

29. The apparatus as defined in claim 1, wherein the support member supports a seat for accommodating at least one person.

30. A multi-motion lifting and transferring apparatus for assisting persons when entering and exiting a vehicle, the apparatus comprising:

an electrically actuated rotator for rotating a support member about a substantially vertical axis; and an electrically actuated extension arm for moving the electrically actuated rotator and the support member along a substantially diagonal plane with respect to the substantially vertical axis.

31. The apparatus as defined in claim 30, further comprising:

an electrically actuated slide tray for moving the electrically actuated extension arm, the electrically actuated rotator, and the support member along a substantially horizontal plane.

32. A multi-motion lifting and transferring method for assisting persons when entering and exiting a vehicle, the method comprising the steps of:

activating an electrically actuated rotator to rotate a support member about a substantially vertical axis;

activating an electrically actuated extension arm to move the electrically actuated rotator and the support member along a plane having a vertical component; and activating an electrically actuated slide tray to move the electrically actuated extension arm, the electrically actuated rotator, and the support member along a substantially horizontal plane.

* * * * *